E. CRANE.
Assignor to C. La Dow.
Harrow-Cultivator.
No. 8,261. Reissued May 28, 1878.
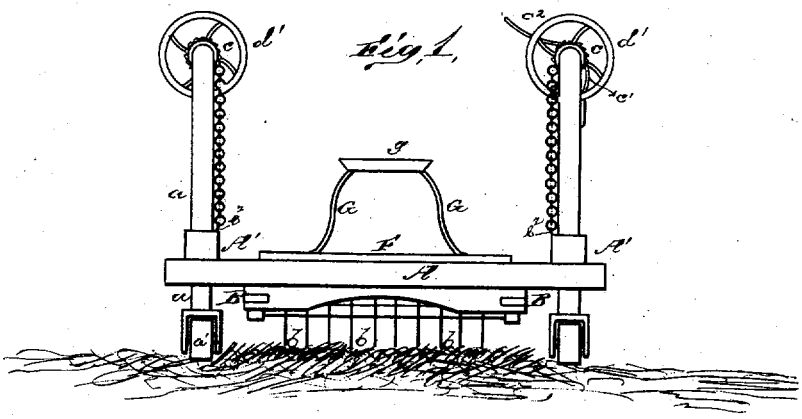
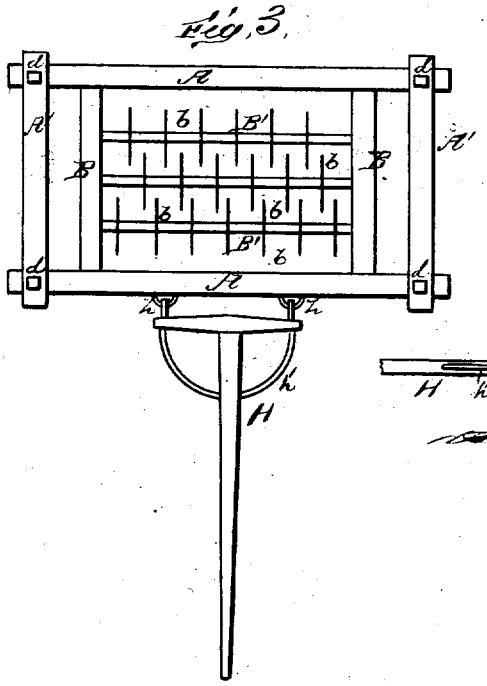
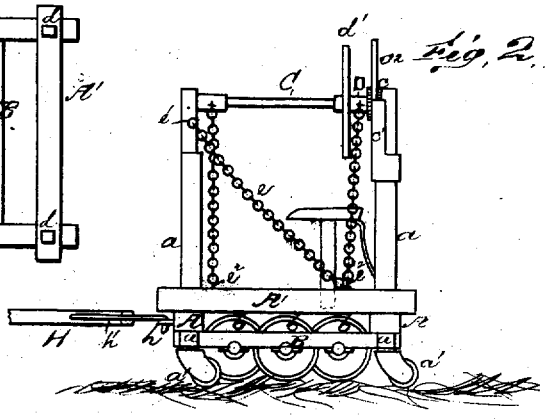
WITNESSES
E. H. Bates
Wm. E. Shiebler
INVENTOR
Elisha Crane
by
W. H. Babcock
ATTORNEY
N. PETERS, PHOTO-LITHOGRAPHER, WASHINGTON, D. C.

UNITED STATES PATENT OFFICE.

ELISHA CRANE, OF ELKHART CITY, ILL., ASSIGNOR TO CHARLES LA DOW.

IMPROVEMENT IN HARROW-CULTIVATORS.

Specification forming part of Letters Patent No. 76,404, dated April 7, 1868; Reissue No. 8,261, dated May 28, 1878; application filed May 15, 1878.

*To all whom it may concern:*

Be it known that I, ELISHA CRANE, of Elkhart City, in the county of Logan and State of Illinois, have invented certain new and useful Improvements in Harrow-Cultivators; and I do hereby declare that the following is a full, clear, and exact description thereof, that will enable others skilled in the art to which it appertains to make and use the same, reference being had to the accompanying drawings, and to the letters of reference marked thereon, which form a part of this specification.

In the accompanying drawings, Figure 1 represents a rear elevation of my improved harrow-cultivator. Fig. 2 represents a side elevation of the same, and Fig. 3 represents a plan view of the same.

My present invention is an improvement on a patent granted me on the 28th day of January, 1868, the object of which was to effectually scarify the soil, so as to render it more easily worked. The machine covered by the said patent was provided with a series of cutting-disks so arranged as to cut the sod in parallel lines. Reference is made to said patent for a fuller description of the devices contained therein, and on which the present invention is an improvement.

The nature of said invention herein described consists, first, in the combination, with the frame of a harrow-cultivator, of a pole, driver's seat, and gangs of revolving disks attached relatively to the main frame at two points, and arranged to prevent the longitudinal rocking of said frame; secondly, in the combination of said disk-gangs, driver's seat, and frame with a pole pivoted to said frame, which pivoted connection allows the said pole to be raised or lowered without affecting the position of the driver's seat; thirdly, in the combination of said disk-gangs with a truck-frame and main frame arranged above said truck-frame, said main frame and truck-frame being attached together at two points, so as to brace the truck-frame against transverse strains; fourthly, in the combination, with the disk-gangs, of a truck-frame and axles passing through said gangs, each axle being secured to the truck-frame, and said truck-frame attached to the main frame by two or more points; fifthly, in the combination, with a frame, of disk-gangs mounted on through-axles, each axle being arranged transversely at different distances longitudinally from the point of draft; sixthly, in providing a harrow-cultivator with gangs having overlapping cutting-disks arranged on through-axles; seventhly, in the combination, with a frame, of two or more gangs of cutting-disks, each gang being arranged to turn with its axle, and each axle being attached to the frame by two or more journals, for limiting the vibration of the axles to the frame and to each other; and, finally, in various other combinations of devices, hereinafter particularly set forth and claimed.

In the accompanying drawings, A designates the main frame of my machine, the end beams A′ of which are firmly attached thereto by bolts or other suitable means. To the long beams of this frame I firmly attach a truck-frame, B, which is provided with metallic sockets, plates, or other suitable bearings for the ends of disk-axles or rods B′. These rods or axles may be made of any suitable number or material, and they are arranged across the line of draft and at different distances longitudinally from the point of draft. These rods I usually form square in cross-section, as thereby the cutting disks or blades *b* can be much more readily secured on the same, as the tendency to slip or slide is greatly reduced when the disks or blades are formed with square openings and have their bearings on square rods; but the form of the rod can readily be changed without affecting the principles of my invention. The rod or disk-axle B′ of each gang, being journaled to the truck-frame B at two points, is guarded thereby against the vibrations (vertical or horizontal or both) to which it would be subject with regard to the other gangs and main or draft frame if journaled at one point only. The disks *b* are made of steel, so that a sharp cutting-edge can always be obtained. They are arranged alternately, so that those of one gang set between those of the next gang, thus avoiding clashing or clogging and insuring a better action on the soil.

In the end pieces A′ of the main frame A I form four square openings, *d*, through which pass four adjustable uprights or standards, *a*.

These uprights may be made of wood, and may be made to fit in suitable metallic sockets. In the lower end of these uprights *a* I attach, in sockets, bearings, casters, or wheels *a'*. In the upper end of said uprights or standards are journaled, one at each end of the machine, windlass-shafts C, carrying metallic sleeves D near their ends. To said sleeves are fastened elevating or hoisting chains E, which are firmly attached at their lower ends to cross-beams A' by means of hooks or loops $e^2$ $e^2$. To one of these hooks $e^2$, at each end of the machine, there is also secured a brace-chain, *e*, which is attached at its upper end to a metallic loop or stud, $e^1$, on the opposite standard *a*. One sleeve, D, on each shaft has, on its inner end, a winding-wheel, *d'*, whereby the windlass-shaft is operated, and on its outer end a ratchet-wheel, *c*, adapted to engage with a pawl, $c^2$, pressed by a spring, $c^1$.

On the frame A, I place a platform, F, which supports driver's seat *g* on seat-bars G. To the forward end of frame A, I attach, by means of ordinary metallic loops *h* and bail *h'*, the tongue or pole H. This method of attachment allows the pole to have vertical vibration without affecting the position of the frame A and the parts carried thereby, so that the machine will operate properly and conveniently in passing over uneven ground.

The use of a pole, instead of drag-chains, allows the driver to retain his seat without being unduly jostled. The journaling of disk-shafts B' at two points insures their steadiness and firmness relatively to the main frame, and vertically.

When it becomes necessary to move the machine from point to point, the wheels *d'* are revolved so as to turn the shaft C and wind the chains E until the frame is raised so as to lift the cutting-disks *b* from the ground. They are then retained in that position by the operation of devices *c* $c^1$ $c^2$. The machine may then be moved on caster-wheels $a^1$. After reaching the desired point the pawl $c^2$ is released, when standards *a a* will descend, bringing disk *b b* again into contact with the ground. The depth of the cut of said disks may also be regulated by the same mechanism.

The attachment of the said truck-frame to the main frame is made at more than one point, whereby any transverse vertical or horizontal vibration of said truck-frame independent of the main frame is prevented.

Having thus fully described my invention, what I claim as new, and desire to secure by Letters Patent, is—

1. The combination, with a cultivator-frame, of two or more gangs of revolving disks, mounted on through-axles, said axles being supported relatively to the frame at more than one point, and said gangs being arranged to prevent longitudinal rocking of said frame.

2. The combination, in a cultivator, of disk-gangs, driver's seat, and frame, with a pole pivoted to said frame, which pivotal connection allows the said pole to be raised or lowered without affecting the position of the driver's seat.

3. In a cultivator, the combination of disk-gangs with a truck-frame and main frame, said main frame being arranged to brace said truck-frame against transverse strain.

4. In a cultivator, the combination, with a truck-frame, of disk-gangs and axles passing through said gangs, each axle being secured to the truck-frame and said truck-frame attached to the main frame at more than one point.

5. In a cultivator, the combination, with a frame, of disk-gangs mounted on through-axles, and each axle arranged transversely to the line of draft and at different distances longitudinally from the front of the machine.

6. In a cultivator, the combination of a frame and disks arranged in gangs on through-axles, so that a disk of one gang will overlap a disk of another.

7. In a cultivator, the combination of two or more gangs of revolving cutting-disks, each gang turning with its axle and each axle journaled at two points to a truck-frame, said truck-frame being connected to said main frame at more than one point.

8. In a cultivator, the combination of a frame with revolving cutting-disks arranged in gangs on through-axles, each axle being attached to said frame by bearings which confine the gangs to a uniform horizontal plane.

9. In a cultivator, the combination of a main frame and truck-frame with gangs of revolving disks mounted on through-axles, the axle of each gang being secured to the truck-frame at two points and the truck-frame being attached at two or more points to the main frame, whereby the said gangs are braced against vertical and transverse strain.

10. In a cultivator, the combination of an axle having a square or equivalent shape in cross-section with a series of cutting-disks correspondingly perforated, so as to turn therewith.

In testimony that I claim the foregoing I have hereunto set my hand this 11th day of May, 1878.

ELISHA CRANE.

Witnesses:
WM. H. DAVIS,
CHARLES THOMPSON.